United States Patent [19]

Kaule et al.

[11] Patent Number: 4,516,031

[45] Date of Patent: May 7, 1985

[54] METHOD OF DETERMINING THE DEGREE OF WEAR OF BANK-NOTES AND A DEVICE FOR CARRYING OUT THIS METHOD

[75] Inventors: Wittich Kaule, Gauting; Walter Renz, Seefeld/Drössling; Gerhard Stenzel, Munich, all of Fed. Rep. of Germany

[73] Assignee: GAO Gesellschaft fur Automation und Organisation mbH, Fed. Rep. of Germany

[21] Appl. No.: 420,735

[22] Filed: Sep. 21, 1982

[30] Foreign Application Priority Data

Oct. 2, 1981 [DE] Fed. Rep. of Germany ....... 3139365

[51] Int. Cl.[3] ............................................ G01H 21/88

[52] U.S. Cl. .................................... 250/562; 209/534

[58] Field of Search .................. 209/534; 356/237, 71; 250/223 R, 223 B, 560, 562, 559, 556

[56] References Cited

U.S. PATENT DOCUMENTS 3,718,823 2/1973 Niikura et al. .................. 250/223 R
4,391,373 7/1983 Wiggins .......................... 250/223 B

OTHER PUBLICATIONS

*IBM Technical Disclosure Bulletin*, Automatically Checked Photoelectric Apparatus, vol. 18, No. 12, 5/1976.

*Primary Examiner*—David C. Nelms
*Assistant Examiner*—Jim Gatto
*Attorney, Agent, or Firm*—Bacon & Thomas

[57] ABSTRACT

A method of determining the degree of wear of bank-notes 1, in which testing is carried out along edge 2 with a photodiode row 30 arranged perpendicular to the direction of transport. Depending on the skew of the note, whichever photodiode of the row completely covering the edge of the note is used for testing. The selection of a diode and the testing are independent of each other and are carried out along predetermined sections of the bank-note edge, controlled by a pulse coupled with the movement of the note. The photodiode ascertained during a selection section 4 is maintained during the entire following test section 3, so that testing is not affected by disturbing changes of the measuring diode. Selection sections 4 can be selected so as to be so short that the test sections 3 succeed each other practically continuously.

8 Claims, 4 Drawing Figures

Figure 4:
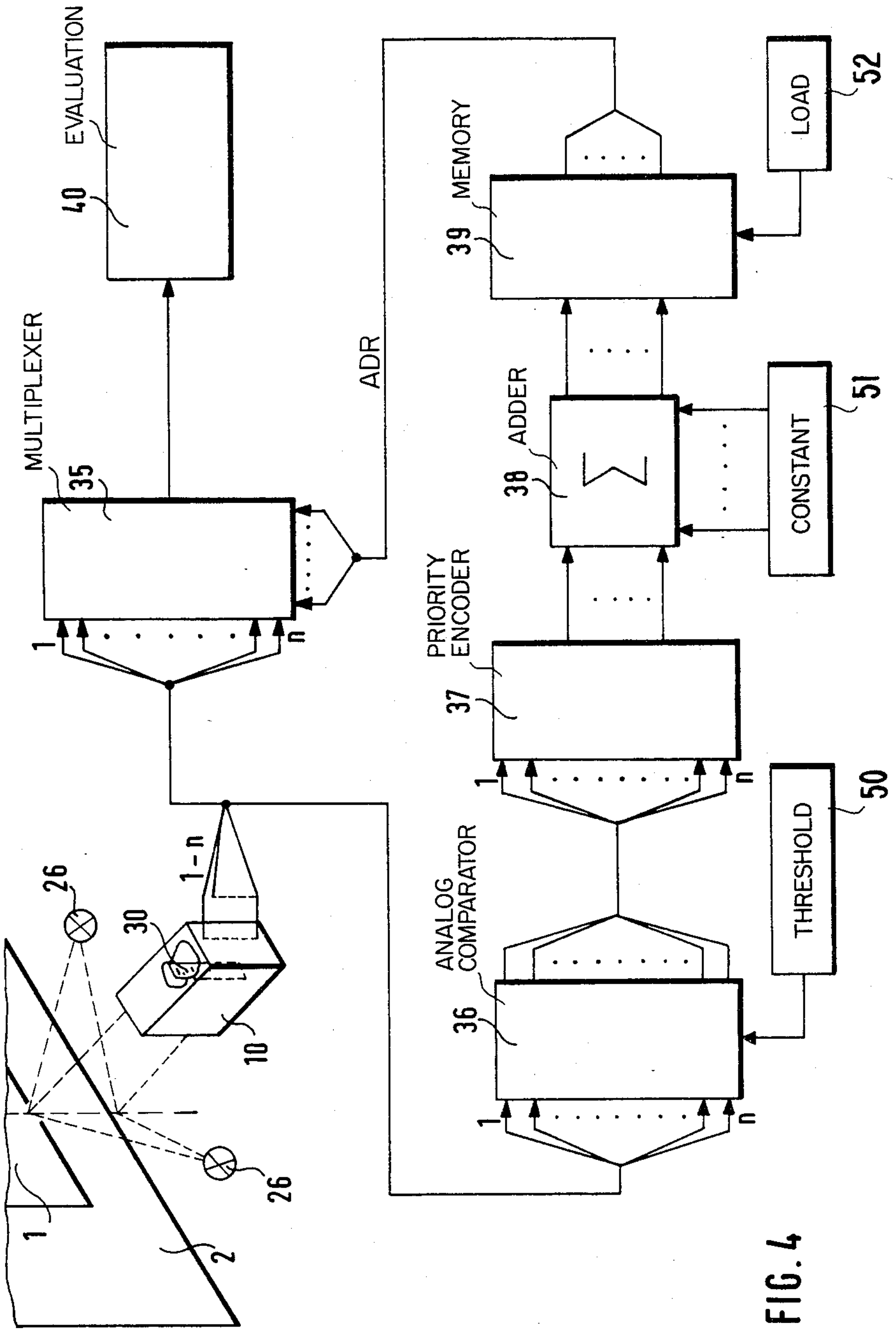

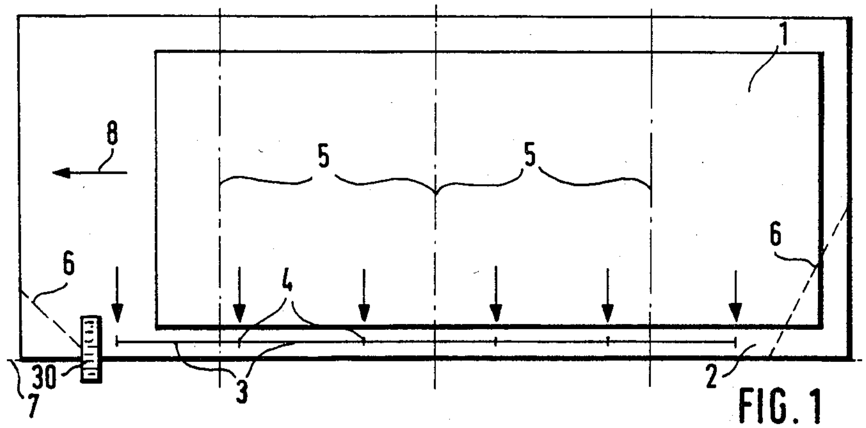
FIG. 1
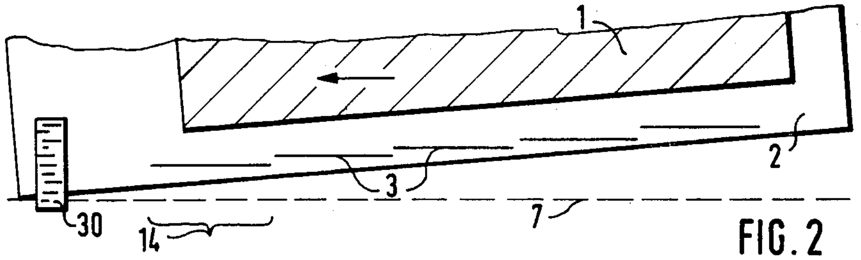
FIG. 2
FIG. 3
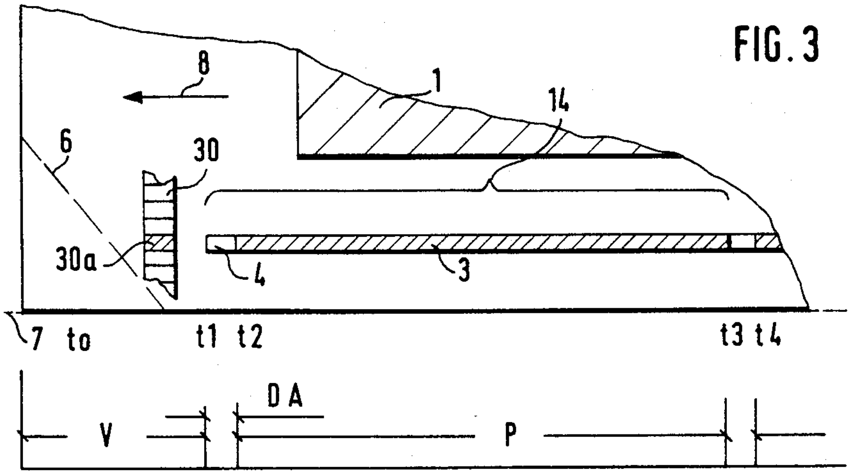

METHOD OF DETERMINING THE DEGREE OF WEAR OF BANK-NOTES AND A DEVICE FOR CARRYING OUT THIS METHOD

The invention relates to a method of determining the degree of wear of bank-notes, whereby the bank-notes are scanned at their edges during transport by a scanning device by several juxtaposed photodiodes, and one photodiode assigned to the edge is used for actual testing at a time by aid of a selection switch.

The invention further relates to a device for carrying out the method.

The testing of bank-notes along the unprinted edge is advantageous in that in this area not only dirt, but also other signs of wear typical for bank-notes, such as cracks and tears, can be ascertained. Since relatively many bank-notes have an unprinted edge, the test device can also be used for bank-notes of different currencies within certain limits.

On the other hand there is the disadvantage that the bank-note cannot be so precisely directed or transported with reasonable effort that a rigidly positioned photodiode is constantly covered by the unprinted edge. Thus it has been proposed (U.S. Pat. No. 3,718,823) that several juxtaposed photodiodes be arranged in the area of the bank-note edge and one diode be selected for testing, for example, as a function of each particular position of the bank-note edge relative to the photodiodes, and this diode be assigned to a certain area of the edge.

If the bank-note edge is displaced relative to the row of photodiodes, the change in the relevant photodiode signal corresponding to the edge is used in a selection switch to select the particular measuring diode for testing which covers the predetermined area of the edge.

The selection process is repeated as often as the skew of the bank-note requires. The selection of the possible measuring diodes thus takes place dynamically, i.e. while the bank-note runs past, every deviation in its position is reacted to immediately. There is therefore a continuous procession of signals at the output of the test device which, ideally, is proportional to the brightness along the edge of the bank-note.

This selection method is advantageous for bank-notes with a small surface in particular, since the test track along the bank-note edge can be evaluated over its entire length without limit, thus yielding a representative testing surface relative to the total surface of the note. This advantage, however, is systematically combined with a disadvantage which makes the method pratically useless for determining the degree of wear of bank-notes. This is true in particular for the high reproducibility of the test result, which is desirable in this connection and is given when the test device yields more or less the same results for equally worn bank-notes no matter whether one and the same bank-note is subjected to repeated testing or a number of more or less equally worn bank-notes are examined. The above-mentioned test device is unable to fulfill this requirement.

Due to the continuous selection method of the measuring diode, the measuring diode is changed more or less frequently depending on the skew of the bank-note as its runs past. Since the changes are carried out parallel to testing and the electronic values of the diodes deviate from each other, there are signal jumps in the measuring signal which may be mistakenly interpreted as discontinuity in brightness caused by dirt. The frequency of the changes of the measuring diode depends on the skew of the note so that different measuring results must be expected for equally worn notes which run through the test device with differing skew. In principle the tolerances in the electrical values of the diodes can be eliminated. But this involves great expenses in circuit technology and calibration, and the time-consuming calibration must be carried out anew at regular intervals due to the different ageing rates of the diodes.

A further disadvantage of the dynamic selection method consists in the fact that tears at the edge of the bank-note are "circumvented", since the corresponding photodiode interprets the limits of the tear as the edge of the bank-note. Small tears are circumvented within the unprinted edge and are not included in the measuring result.

The problem of the invention consists in proposing a method of determing the degree of wear of bank-notes which avoids the above-mentioned disadvantages and thus attains a high degree of reproducibility in testing.

The problem is solved according to the invention by the features stated in the characterizing part of the main claim.

The selection of the particular measuring diode and the testing of the bank-note are carried out in fixed areas independently of one another, i.e. the selection switch is rendered functionless during testing so that there is no disturbing change of the measuring diode during testing.

The selection sections are preferably chosen so as to be very short relative to the test sections and distributed along the edge of the bank-note in such a way that they do not coincide with the main folding points of the bank-note where tears are usually found.

Tears are thus located in the area of the test sections and are included in the status evaluation, as opposed to the prior art method.

Since the selection of the measuring diode is carried out within very short areas, almost the entire area of the bank-note remains for testing.

Due to the division of the bank-note edge into single test sections, it is finally possible to carry out a single evaluation of the test sections in a simple manner, thus allowing for the identification of partial irregularities (such as tears) at the edge of the bank-note.

The mean value can be formed for the overall evaluation of the bank-notes after they have run through the test device, and this mean value can be compared with a corresponding should-be value.

Further advantages and designs of the invention can be found in the subclaims and in the following description, which describes an embodiment with reference to the adjoined figures.

These show:

FIG. 1 a bank-note whose edge is divided into test and selection sections,

FIG. 2 a bank-note running at a slant, whose edge is divided into test and selection sections, FIG. 3 a detailed breakdown of a measurement cycle along the edge of the bank-note FIG. 4 a circuit arrangement for diode selection.

FIG. 1 shows in an exemplary embodiment of the invention the division of a bank-note edge 2 into diode selection sections and test sections. The position of the selection sections 4 which are very short relative to the test sections 3 is marked by arrows. The position of test sections 3 is selected so that the latter coincide with the main folding points (marked by lines 5) of bank-note 1, which are usually the dirtiest and partly torn, and thus subject them to an evaluation.

The position and the number of test sections 3 are also selected so that any dog's-ears which may be present (indicated by dotted lines 6) do not have any effect on testing.

FIG. 1 shows the normal course of a bank-note 1 along an indicated transport plane 7 in the direction of arrow 8. During the normal course, the photodiode of photodiode row 30 which was used before for testing is also selected in selection sections 4 for the following test section.

To demonstrate readjustment of skew, FIG. 2 shows an enlarged segment of the first bank note edge 2 along with photodiode row 30 which exhibits as the signal pick-up of a test device a number of juxtaposed photodiodes perpendicular to the transport plane of note 1. According to the position of the lower edge of the bank-note relative to the stationary diode row 30, a photodiode is selected within a selection section 4, which definitely remains covered by edge 2 of the note for the duration of the following test section 3. Since the diode selected is not changed during test section 3, as explained above, the length of a test section must be matched with the maximum expected skew of the note.

Selection section 4 and test section 3 (not shown in FIGS. 1 and 2) each form a measurement cycle 14, the detailed breakdown of which is shown by way of example in FIG. 3.

We assume that the bank-note moves past diode row 30 in the direction of arrow 8 on a transport plane indicated by line 7. The movement of bank-note 1 is directly coupled with a machine pulse (MAT) via the transport system so that the duration of a MAT period corresponds to a defined unit of length (transport path) on the bank-note, independently of the speed of the bank-note's movement. Due to this coupling it is possible to initiate sections 4 and 3 of measurement cycles 14 at any positions at all on the bank-note edge as a function of the number of the MAT periods added up after the leading edge of the bank-note has run into the test device.

As soon as the leading edge of the bank-note reaches diode row 30 at point of time $t_0$, the addition of the MAT periods begins, as well as a delay section (V) at the same time which lasts until point of time $t_1$, during which there is no evaluation of measuring signals, in order to eliminate the influence of dog's-ears, for example.

At the end of delay section (V) at time $t_1$, the first measurement cycle is initiated. Until time $t_2$ there is then the first diode selection section 4 (DA), in which the photodiode to be considered for the following test section 3, for example diode 30 *a*, is selected. Test section 3 extends from time $t_2$ until time $t_3$. At time $t_4$ the second measurement cycle begins with the selection of the photodiode now relevant.

The test result of one section obtained in an evaluating unit can be subjected to single evaluation by comparison with a given should-be value, or it can be used for an overall evaluation of the note via an intermediate memory after all measurement cycles have been run through. Whereas the assessment of partial results allows for the isolation of local abnormalities, the overall evaluation is a measure for the overall appearance which a bank-note has with respect to its condition.

In the example shown in FIG. 1, 5 measurement cycles were selected according to the geometry and other physical properties of the note (folding points, dog's-ears). The selection of the measuring diode can be carried out within a MAT period, which corresponds, for example, to a transport path of 1 mm.

But it is also possible to select the selection section so as to be so short (e.g. 1/10 MAT or 1/10 mm) that it becomes smaller or considerably smaller than the measuring surface given by the scanning system. Thus practically no information is lost for the test device due to the selection period. In spite of this quasi-continuous scanning, however, the above-mentioned disadvantages of the known method of U.S. Pat. No. 3,718,823 are avoided.

In the following, the mode of operation of the diode selection is described in detail with reference to FIG. 4.

The edge 2 of bank-note 1 is illuminated by lighting sources 26 arranged on both sides of a measuring head 10. The light remitted by the illuminated surface reaches measuring head 10 which contains not only suitable imaging optics (not shown in the figures) but also diode row 30. The parallel signalling lines of the various photodiodes lead to a selection switch in which, depending on the signal levels of the various diodes, the diode is selected which is definitely covered by edge 2 of the bank-note along the following test section. The signal of the selected photodiode reaches an evaluating unit 40 for processing, as is described for example in German Offenlegungsschrift No. 27 52 412.

The photodiode for a test section is selected by addressing a multiplexer 35 to which all signalling lines 1−n of diode row 30 lead. The address representing a certain diode, which remains constant for the length of each test section, is ascertained from the content of all the photodiodes' signals.

All signalling lines 1−n of the photo-diodes also lead to an analog comparator 36, which generates at its output on each signalling line either the level log. H or the level log. L by aid of a threshold 50 (log. L corresponds to 0-level). The logic is defined in such a way that a signalling line exhibits a log. L state when the corresponding diode is not covered by the bank-note. The parallel digital signals of the analog comparator 36 reach a so-called priority encoder 37, which transforms the input information into a BCD signal. Only the signalling line with the highest valency is decoded. If, for example, the signalling lines of photodiodes 1–3 have the log. L state, then information corresponding to number 3 in the decimal system is found at the output of encoder 37 in the BCD code. Thus the photodiode is selected which at the moment is no longer covered, or not sufficiently covered, by the bank-note edge. To select a photodiode which is definitely covered by the edge of the bank-note, a constant number 51, for example, number 2, is added in a full adder 38, so that in this case the fifth diode (seen from the normal transport plane of the note) takes over the scanning of the bank-note edge. The information corresponding to number 5 in the BCD code is directed to the input of an intermediate memory 39. Within each diode selection section (see FIG. 3, sections $t_1$–$t_2$, $t_3$–$t_4$, etc.) a signal is generated by a suitable control unit, which signal transmits the input information to the output when fed as a load signal 52 to memory 39.

Thus the information is available as an address for multiplexer 35 and is retained there until the next diode selection pulse appears. According to the address, multiplexer 35 switches the signalling line of the photodiode to be used to the evaluating unit.

Whereas the data up to the input of memory 39 thus represent the position of the moment of bank-note edge 2 relative to diode row 30, the data at the output of the memory wait statically and are each actualized by the load pulse. When the load pulse appears, the length of which determines the selection or switching period, the processing of the measuring signal is interrupted and thus any possible feedback is avoided on the processing of the measuring signal. The actual evaluation of the measuring signal obtained from a test section can be carried out, for example, during the following test section using a separate evaluating section even before switching.

We claim:

1. A method of determining the degree of wear of banknotes wherein the banknotes are transported past a detection device having a plurality of juxtaposed photodiodes which detect light received from an edge of the banknote comprising the steps of:

(a) establishing an examination interval adjacent to one edge of the banknote;

(b) dividing the examination interval into a plurality of measurement sections, each measurement section being preceded by a selection section;

(c) selecting a single photodiode during passage of a selection section; and, (d) using the output of the selected photodiode during passage of the subsequent measurement section to determine the wear of the banknote.

2. A method as in claim 1, wherein the length and position of the selection and measurement sections are determined by a machine pulse coupled with the speed of a transport system of the bank-note.

3. A method as in claim 1, wherein the length or duration of the selection sections are shorter than the measurement sections so that the measuement sections are virtually continuous along the edge of the banknote.

4. A method as in claim 1, wherein the measurement sections are compared one by one with corresponding limiting values.

5. A method as in claim 1, wherein a mean value of all measurement sections is determined and the mean value is compared with a corresponding limiting value.

6. A method as in claim 1, wherein the light remitted by the edge of the banknote and reaching the photodiode is evaluated.

7. A device for determining the degree of wear of banknotes, comprising: a lighting unit to illuminate the edge of a bank-note which is transported past the device; a row of photodiodes arranged perpendicular to the transport device; selection switch means which selects a photodiode covered by the edge of the banknote as a function of the skew of the bank-note, the selection switch means (36, 37, 38) ascertains a BCD value for each diode exclusively covering areas of the bank-note edge; and a memory connected to the selection switch means which is loaded with each BCD value ascertained in a selection section and offers this value for the duration of the particular measurement section; and a multiplexer connected to the memory and the photodiodes (35) which is activated by the BCD value and conducts the signalling line of the corresponding diode.

8. A device as in claim 7 having a selections witch means to ascertain a photodiode covered by the edge of the banknote, comprising:

an analog-comparator (36) which picks up the signals of the photodiodes in parallel and generates at its output either the value log. H or log. L as a function of a threshold where log.L corresponds to a zero level and log.H corresponds to a level greater than zero;

a priority encoder (37) which converts a signal change from log. H to log. L into a BCD value; and a full adder (38) which adds a constant to the BCD value and retransmits the result to the memory (39).

* * * * *